United States Patent
Lloyd et al.

[11] 3,809,518
[45] May 7, 1974

[54] PRODUCTION OF BODIES FROM SYNTHETIC PLASTICS MATERIALS

[75] Inventors: Brian Edwin Lloyd, Sedgley; Barry John Marsh, Penkridge, both of England

[73] Assignee: GKN Group Services Limited, Worcester, England

[22] Filed: Feb. 28, 1972

[21] Appl. No.: 229,839

[30] Foreign Application Priority Data
Mar. 1, 1971  Great Britain...................... 5736/71

[52] U.S. Cl................... 425/244, 425/246, 425/261
[51] Int. Cl............................................... B29c 1/00
[58] Field of Search.......... 425/233, 234, 244, 246, 425/436, 441, 185, 261, 259

[56] References Cited
UNITED STATES PATENTS
| | | | |
|---|---|---|---|
| 2,663,905 | 12/1953 | Van Riper et al. ................ | 425/234 |
| 3,310,620 | 3/1967 | Martelli et al. ................ | 425/233 X |
| 3,323,167 | 6/1967 | Verges et al. ................ | 425/233 |
| 3,719,441 | 3/1973 | Spaak et al. ................ | 425/244 X |

*Primary Examiner*—Richard B. Lazarus
*Attorney, Agent, or Firm*—Kurt Kelman

[57] ABSTRACT

The specification discloses a cyclic method of, and apparatus for, the production of bodies, particularly preforms for further shaping, of synthetic plastics material. There is provided a series of inter communicating mould cavities and plastics material is injected into the cavity at the input end of the series by decreasing the volume of an accumulator chamber to which the material is continuously fed. The volume of the chamber is allowed gradually gradually to increase as more material is fed into it after the cavity at the input end has been filled while the series of mould cavities is still connected to the chamber whereby material is fed into the series from the accumulator chamber to prevent the formation of voids due to shrinkage. The series is only disconnected from the accumulator chamber while an empty mould cavity is being provided at the input end of the series and an article removed from the output end thereof so that the formation of voids due to shrinkage is substantially avoided.

7 Claims, 6 Drawing Figures

PRODUCTION OF BODIES FROM SYNTHETIC PLASTICS MATERIALS

BACKGROUND OF THE INVENTION

1. Field of the Invention

This invention relates to the production of bodies from synthetic plastics material. The invention has been developed particularly for the manufacture of "preforms" intended for further processing, e.g., for forging, but the invention is not limited thereto and can be employed for making comparatively simple articles. For convenience, in the following description reference will only be made to the manufacture of preforms but it will be understood that the invention may be used for making bodies of other forms.

2. Description of the Prior Art

There are two problems encountered in the making of thick section bodies such as preforms from synthetic plastics material such as polypropylene. The first of these problems is that as the fluid material cools and solidifies it shrinks and therefore if no measures are taken to apply pressure to the preforms during cooling or to feed further fluid material to the preforms as they cool the preforms have voids and surface sink marks and are unsuitable for further processing.

The second problem is that synthetic plastics material such as polypropylene is a good heat insulator and therefore when moulding preforms there is a considerable waiting time before the preforms are sufficiently cool and solidified to be taken out of the mould. It is therefore necessary to have some means of producing a series of preforms so that some are cooling while others are being initially formed.

It is an object of the present invention to provide a method of, and apparatus for, the production of bodies of synthetic plastics material suitable for use as preforms or other purposes and which overcome the two problems mentioned above in a simple and economical manner.

SUMMARY OF THE INVENTION

According to one aspect of the invention we provide a cyclic method of producing bodies of synthetic plastics material comprising providing a series of intercommunicating mould cavities, the series having an input end and an output end, and carrying out a plurality of moulding cycles each including feeding said material in a fluid state into an accumulator chamber, reducing the volume of the accumulator chamber to displace fluid material from the chamber substantially to fill the mould cavity at the input end of the series, maintaining said mould cavity in communication with the chamber while feeding material into the latter and gradually increasing the volume of the chamber while maintaining the material in the chamber under sufficient pressure to cause material to flow into the mould cavities of the series to take up shrinkage of said material as it solidifies in such mould cavities disconnecting the series from the chamber at the input end of the series, providing an empty mould cavity at the input end of the series and in communication with the previously filled mould cavity at the input end of the series and bringing said empty mould cavity into communication with the chamber.

With this method, pressure is maintained on that part of the synthetic plastics material which is still fluid in the mould cavities of the series for the whole time except when the mould cavity at the inlet end of the mould series is disconnected from the accumulator chamber to enable an empty mould cavity to be provided at the input end thereof and during the short period when the empty mould cavity is being filled from the accumulator. The use of an interconnected series of mould cavities means that a mould cavity at the input end may be filled with the fluid synthetic plastics material while the material in other mould cavities of the series is cooling and that a mould cavity at the output end of the series may be emptied simultaneously with or immediately before the provision of an empty mould cavity at the input end of the series or if desired the part or parts which define the mould cavity at the output end and which has or have been removed from the output end of the series may be transferred immediately to the input end of the series.

Pressure is maintained on the material in the mould cavities in the series for a major proportion of the cycle time, such pressure only being interrupted when it is necessary to provide and fill an empty mould cavity at the input end. Any shrinkage which takes place of the fluid plastics material as it is cooling and solidifying therefore can be compensated for by the flow of material under low pressure from the accumulator chamber into the mould cavity at the input end of the series and, since adjacent mould cavities of the series intercommunicate, fluid material can flow from one mould cavity to the next of the series to compensate for shrinkage. The compensation pressure will be the pressure in the accumulator chamber during the filling of the latter while the mould cavity series is still connected thereto.

Preferably, the fluid synthetic plastics material is fed into the accumulator chamber continuously. If there is a continuous feed then the mould cavity at the input end of the series is disconnected from the chamber before the chamber is full and material continues to be fed into the chamber while an empty mould cavity is being provided at the input end of the series. The proportion of the volume of the accumulator chamber which is filled before disconnection will depend on the parameters of the method, in particular the proportion of the cycle time during which the accumulator chamber is disconnected from the mould series. In an example, however, the accumulator chamber, having a volume greater than that of the body to be produced, may be increased in volume to say 80 percent of the volume required to fill a mould cavity before the mould cavity at the input end of the series is disconnected therefrom. The material continues to be fed into the accumulator chamber until the chamber contains sufficient material to fill a mould cavity when the next cycle commences. If apparatus for use in the method is intended for making bodies of different sizes then the volume of the accumulator chamber will be adjusted to be greater than the volume of the particular body to be produced.

It is preferred to feed the fluid plastics material into the accumulator continuously as described but it would be possible, if desired, to shut off the feed of material to the accumulator during the provision of an empty mould cavity at the input end of the series. One could, for example, have two accumulator chambers and two series fed from a single feed means and so arranged that material is fed into one accumulator chamber while the other is disconnected from its series and vice versa. In a further arrangement, the material could go to waste if a continuous feed means is provided during the time that the mould series is disconnected from the nozzle but this is a very expensive method.

The volume of the chamber is reduced with the material therein under a relatively high pressure and during increase in volume of the accumulator chamber the material is under a relatively lower pressure. Where the material is fed continuously into the accumulator chamber obviously the pressure capable of being applied to feed the material into the chamber will be greater than either the relatively higher or relatively lower pressure.

The pressure on the material in the accumulator chamber is preferably maintained by hydraulic means which can be sequenced in each cycle to give both the relatively higher pressure to displace material from the accumulator chamber into the mould and the relatively lower pressure at which the accumulator is refilled while in communication with the mould series. The relatively lower pressure can be obtained by allowing the chamber to increase in volume at a controlled rate while feeding the material into the chamber.

According to another aspect of the invention we provide apparatus for use in the moulding of synthetic plastics material, the apparatus comprising an accumulator having a chamber for said material, feed means arranged to feed fluid material into the chamber, means for varying the volume of the chamber while maintaining material therein under a desired pressure, a nozzle in communication with the chamber, mould means defining a series of intercommunicating mould cavities, the series having an input end and an output end, the input end being adjacent to the nozzle which is arranged to feed material into the mould cavities of the series at the input end and means for causing relative movement between the nozzle and the series so as to enable mould means to be moved from the output end of the series, to be inserted, after it has been emptied, at the input end of the series to provide an empty mould cavity and then brought into engagement with the nozzle.

Preferably, the nozzle is associated with a shut-off valve which is opened when the nozzle is engaged with the mould means and is closed when the nozzle is disengaged from the mould means.

Preferably, the means for feeding the fluid material into the accumulator chamber is a screw feeder arranged to work continuously. As has been described above, the series is disconnected from the accumulator chamber before the latter is completely full and in the preferred arrangement material is continuously fed into the chamber while an empty mould cavity is being provided at the input end.

Preferably, a hydraulic piston and cylinder assembly is provided for varying the volume of the accumulator chamber and operates under a relatively higher pressure to reduce the volume and under a relatively lower pressure whilst the volume is being increased. The piston may be moved against a resistance comprising a restriction to hydraulic fluid flow by the pressure of the material entering the accumulator to increase the volume of the accumulator chamber. When the piston is fully retracted, its position may be sensed and high pressure hydraulic fluid then connected to the cylinder to cause the piston to reverse direction to reduce the volume of the chamber and to displace material into the mould at the input end of the series.

Preferably, means is provided for cooling at least some of the mould cavities of the series to accelerate the solidification of the plastics material therein. Preferably, the mould cavity at the input end of the series is not cooled and a small number of mould cavities at the output end of the series may have hot air passed round them to remove excess cooling liquid, to commence the reheating of the moulds for insertion at the input end of the series and reduce seepage of the liquid used to cool the intermediate moulds.

Preferably, the apparatus includes means to transfer mould means from the output end of the series to the input end thereof and means for heating such mould means may be associated with said moving means so that as the mould moves from the output end to the input end of the series it can be heated and will arrive sufficiently hot at the input end to be inserted into the series.

Preferably, the accumulator chamber and the nozzle are stationary and the mould series is moved into and out of engagement with the nozzle. However, if desired the mould series could be maintained stationary and the nozzle with or without the accumulator chamber moved into and out of engagement therewith.

BRIEF DESCRIPTION OF THE DRAWINGS

The invention is also concerned with various other mechanical features of the apparatus which will be apparent from the following description of the method and apparatus of the invention which is by way of example and which is made with reference to the accompanying drawings in which:

Referring to FIGS. 1 and 2, the apparatus comprises a supporting frame indicated generally at 10 and comprising a lower part 11, an intermediate part 12, and an upper part 13. The lower part 11 supports a mould table 14. This table is movable vertically by means of a toggle mechanism comprising toggle arms 15 which are pivoted respectively to the table 14 at 16 and to the lower part 11 at 17. The toggle joint 18 is connected to the piston rod 19 of a hydraulic jack the cylinder of which is indicated at 20, the cylinder being pivoted to the lower part 11 at 21. In FIG. 1 the table is shown in its uppermost position, and it will be appreciated that by retracting the piston rod 19 to the right in FIG. 1 the table 14 will be lowered. An abutment 22 is provided against which the toggle arms 15 abut when the table 14 is in its raised position, thus determining the upper position of the table. Mounted on, and secured to, the table 14 is a tubular guide 23 which is provided with slides 23a which engage with complementary slides 11a on the lower frame part 11, so as to guide the guide 23 for vertical movement.

Figure 2:
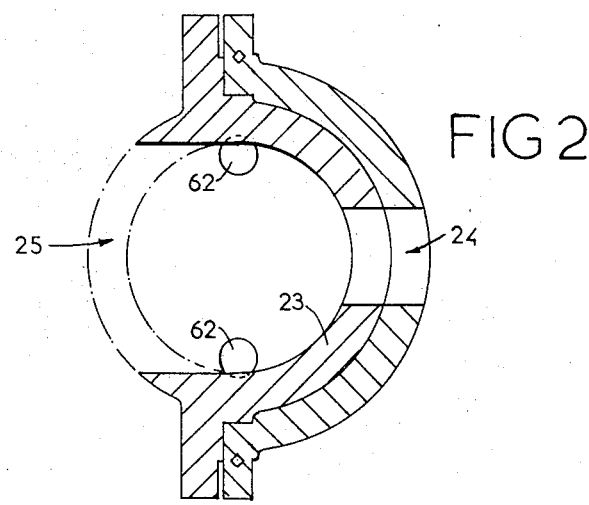
FIG. 2 is a diagrammatic horizontal section of the line 2—2 of FIG. 1 with the mould elements omitted for clarity.

At its lower end, the guide has diametrically opposed openings 24 and 25 which are clearly shown in FIG. 2. Bolted to the upper end of the guide is a cylinder member 26 and slidable within the cylinder member is a piston member 27 which has a cylindrical extension 28, which at its upper end has threadedly engaged therewith a flange member 29. The cylinder member 26 has an upwardly extending rim 30, which is received between the cylindrical extension 28 and a downwardly projecting rim 31 on the flange member 29. A series of compression springs 32 are inserted between the cylinder member 26 and the flange member 29 thus tending to move the piston member 27 to its uppermost position. The piston member may be moved downwardly by introducing hydraulic fluid into the cavity 33 between the cylinder and piston members 26 and 27. At its upper end, the guide 23 is provided with an opening 34 whereby a mould can be inserted into the guide as will be described below.

Figure 1:
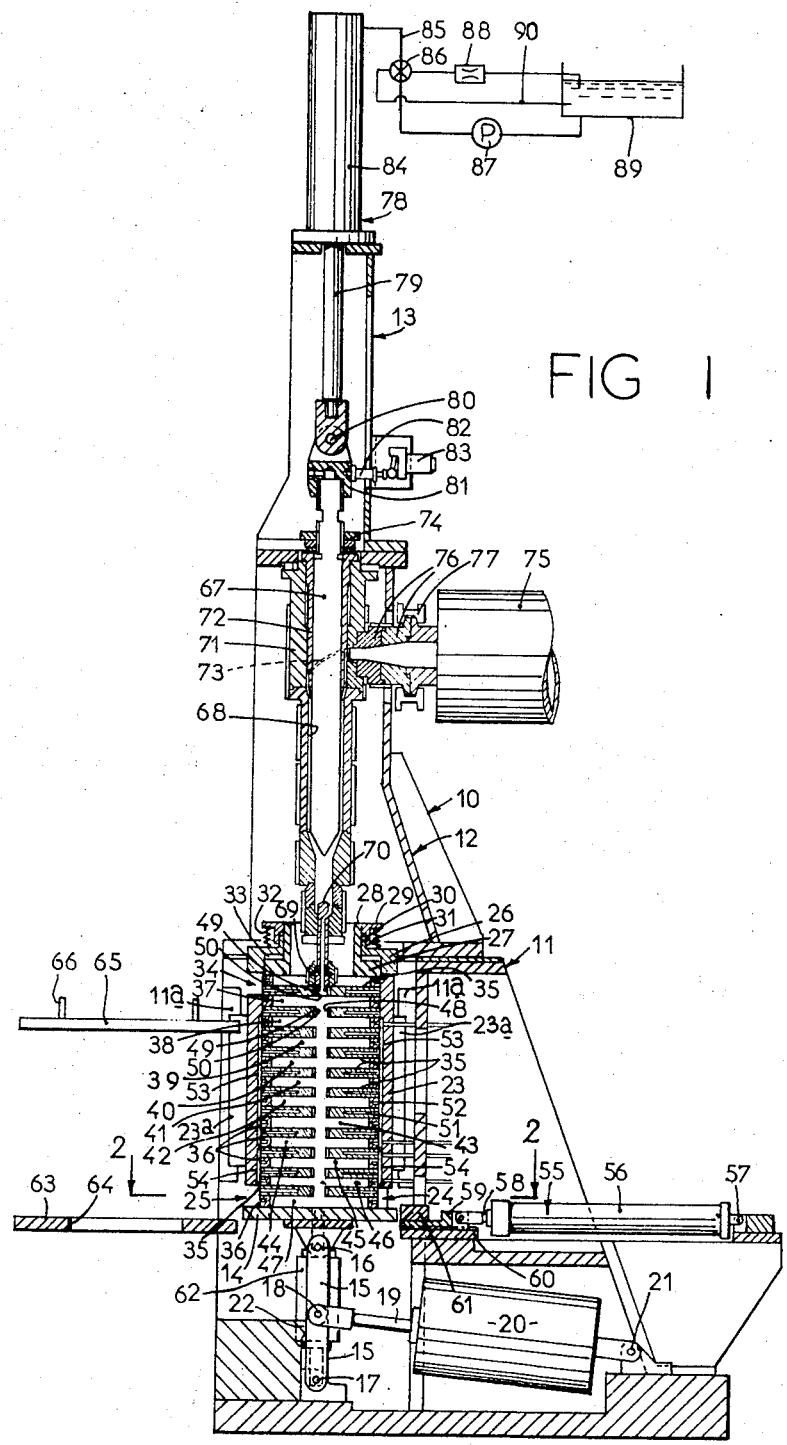
FIG. 1 is a diagrammatic vertical section of apparatus embodying the invention.

As shown in FIG. 1, the guide 23 contains a plurality of mould elements. The mould elements are of two types, thus there is a plurality of plate-like elements 35 and a plurality of ring-like elements 36. Adjacent plate-like elements 35 are separated by ring-link element 36 so that the stack of elements produces a series of moulds the cavities of which are indicated at 37 to 47 respectively. It will be seen that the cavity 47 at the bottom of the stack of moulds is partly defined by the upper surface of the mould table 14. Each element 35 has a central aperture 48 in which is mounted on insulated bush 49, the bush itself having a bore 50.

Each element 35 has passages 51 therein, and each element 36 has passages 52 therein. These passages are arranged to receive heating and cooling fluid. The elements 35 and 36 defining the cavities 38 to 44 are cooled by means of water or other cooling medium passed through the passages 51 and 52 via passages 53 in the guide 23 and the elements defining the cavities 45 and 46 are preheated by warm air passed through the passages 51 and 52 therein from passages 54 in the guide 23.

The lower frame part 11 carries means for ejecting a mould from the guide as will be described below and comprising a hydraulic jack 55, the cylinder 56 of which is pivoted at 57 to the frame part 11. The piston rod 58 of the jack 55 is connected to a slide 59 which runs in a guide 60, and the slide 59 carries a nose block 61 which is arranged, when the table 14 is lowered, to pass through the opening 24 and to eject the lowest pair of elements 35 and 36 from the guide 23.

Referring now to FIG. 2, the table 14 carries a pair of pneumatic rams 62 which are arranged on a diameter of the guide 23 and are spaced apart so as to be capable of engaging a ring 36 to hold up the mould stack within the guide 23 as will be described below. When the lower pair of mould elements have been ejected from the guide 23 they are received on an ejection platform 63 having an opening 64 therein through which the article moulded in the cavity 47 can drop thus emptying the mould. An insertion platform 65 is provided having a removable heating jacket 66 and the platforms 63 and 66 may, if desired, be interconnected by an endless belt or the like, so as to enable an empty mould to be moved from the lower position to the upper position for reinsertion into the guide 23.

The intermediate frame part 12 rests on and is secured to the frame part 11 and carries a ram 67, which is reciprocable within an accumulator chamber 68. At the lower end of the chamber 68 is carried a nozzle 69 associated with a valve member 70. As shown in FIG. 1 the nozzle is arranged to enter the bore 50 of an insulating bush 49 in an element 35 and the valve is so arranged that when the nozzle is so engaged the valve is open, whereas when the nozzle is disengaged the valve automatically closes.

The accumulator chamber 68 is formed in a housing 71, which contains a guide 72 having a guide surface 73, to lead molten plastic material into the accumulator chamber as will be described. The ram 67 is received within the guide 72 and there is a gland arrangement 74 at the top of the chamber.

The intermediate frame part 12 also carries an extruder or feed device 75 for supplying molten plastics material to the accumulator chamber 68. The material passes from the extruder through injection dies 76 into the chamber 68 and is guided by the guide 72 to enter the chamber. The extruder is secured to the frame by means of a chain collar 77.

The upper frame part 13 rests on, and is secured to, the intermediate frame part 12 and carries a single-acting hydraulic ram indicated generally at 78. The piston rod 79 of the ram is connected through a clevis connection 80 to the upper end of the ram. A collar 81 at the upper end of the ram carries an operating member 82 for a sequence switch 83. The collar 81 may carry a further operating member such as 82 to operate further switches to enable the machine to sequence.

The cylinder 84 of the ram 78 is connected via a line 85 and the valve 86 selectively to a pump 87 and a restriction 88. The pump and the restriction are connected to a reservoir 89 of hydraulic fluid. A by-pass connection 90 extends from the valve 86 to the reservoir 89. In one position of the valve 86 fluid is pumped by the pump 87 from the reservoir 89 into the cylinder 84 thus causing the piston rod 79 and the ram 67 to descend. In another position of the valve, the output from the pump 87 is by-passed along the by-pass line 9- into the reservoir 89 and fluid can flow out of the cylinder 84 through the restriction 88 back into the reservoir 89.

The method of the invention and the method of operation of the apparatus described in relation to FIGS. 1 and 2 will now be described in relation to FIGS. 3 to 6 which are diagrams showing various stages of the operation of the apparatus, various parts having been omitted for simplicity.

Figure 3:
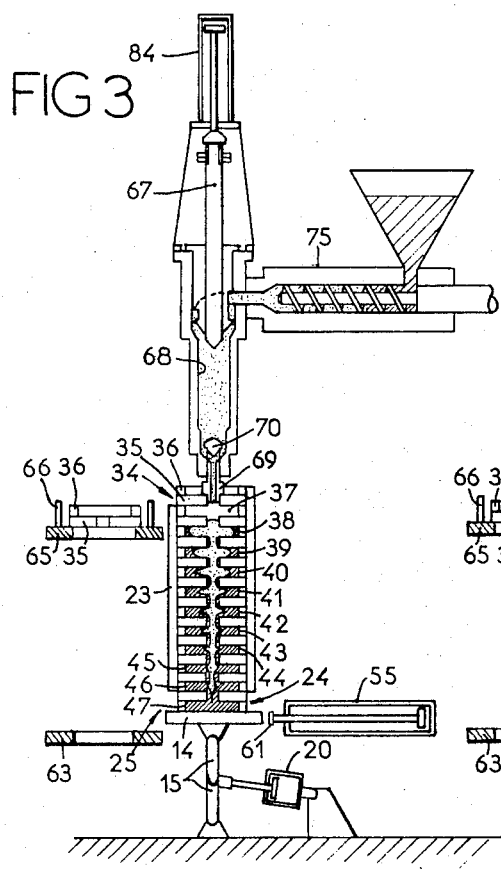
FIGS. 3 to 6 are diagrams illustrating the method of use of the apparatus of FIGS. 1 and 2.

Referring to FIG. 3, this shows the state of the apparatus at the beginning of a cycle. The uppermost elements 35 and 36 have been inserted through the openings 34, and the nozzle 69 has been brought into engagement with the element 35 as will be described below. The cavity 37 is empty and the remaining cavities 38 to 47 are all in communication through the bores 50 of the bushes 49 in the elements 35, and are all full of plastic material, the material in the lower cavities being substantially wholly solidified and the material in the upper cavities being molten in the interior parts thereof. In FIGS. 3 to 6 we have illustrated the solid plastics material by cross hatching and the molten material by the dotted areas. It will be seen that the amount of molten material decreases from the cavity 38 to the cavity 47 and in the latter there is substantially no molten material.

In FIG. 3, the mould table 14 is in its uppermost position, the ram 67 is substantially fully retracted and the accumulator chamber 68 is substantially full of molten plastics material. The valve 70 is open since the nozzle 69 is engaged with the uppermost mould element 35. Although not shown in FIGS. 3 to 6 the piston member 27 is urged downwardly by oil being introduced into the cavity 33 so as to force the superposed mould elements 35 and 36 in the guide 23 into contact with one another and into contact with the mould table 14 so as to prevent flashing between adjacent mould elements. It will also be seen that there is a further pair of mould elements 35 and 36 on the insertion platform 65 and that these are being preheated by the heating jacket 66. It will be noted that the element 36 is resting on the element 35 on the platform 65.

Figure 4:
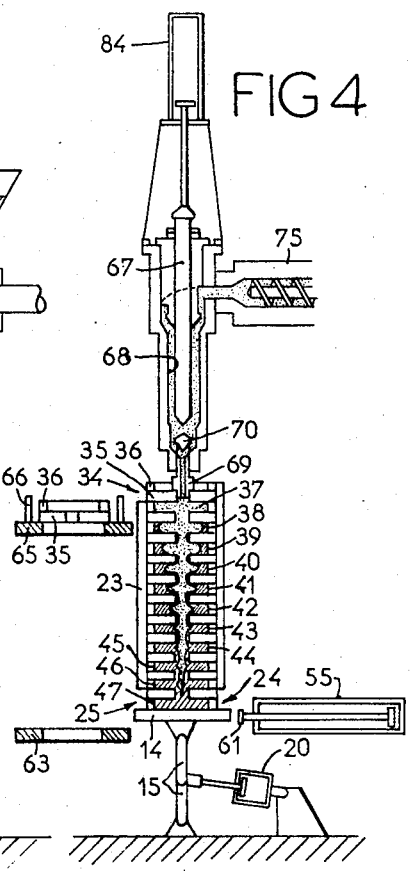

When the ram 67 reaches the upper end of its stroke as shown in FIG. 1 it trips a switch which operates the valve 86 so that fluid pressure from the pump 87 is applied to the hydraulic cylinder 84 and the ram 67 moves rapidly downwardly to the position shown in FIG. 4. This rapid movement of the ram displaces material from the accumulator chamber 68 into the cavity 37 to fill the same and simultaneously pressurises the material in the remaining mould cavities by virtue of the intercommunication between the mould cavities. Any shrinkage of material in the mould cavities is therefore taken up by material fed from the accumulator 68. The extruder 75 operates continuously and the pressure at which it is capable of feeding the molted plastic material into the accumulator chamber 68 is greater than the pressure exerted by the ram 67 so that there is no feed back of material from the accumulator chamber into the extruder. FIG. 4, therefore, shows the cavity 37 full and the other cavities under pressure.

When the ram 67 reaches the bottom of its stroke it operates the sequence switch 83 which operates the valve 86 so that fluid from the cylinder 84 can pass through the restriction 88 back to the reservoir 89. The ram 67 now commences to retract upwardly, the ram being moved upwardly by the pressure of the molted plastics material which is fed into the accumulator by the extruder 75. Thus this pressure is forcing the ram upwardly and displaces the hydraulic fluid from the cylinder 84 back into the reservoir 89.

Figure 5:
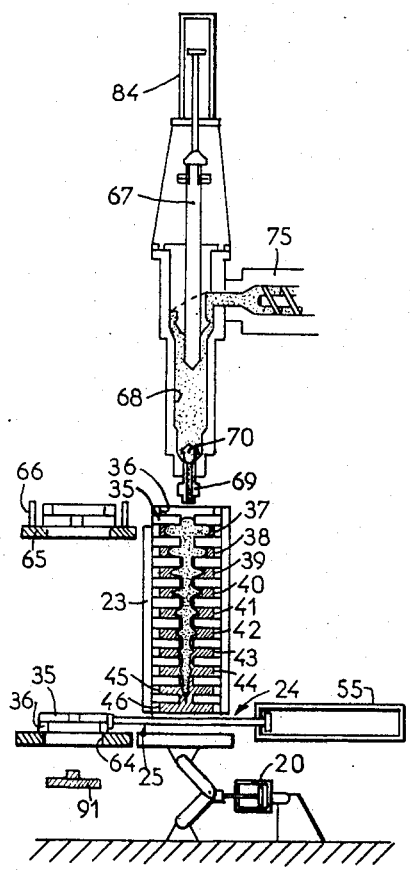

When the ram 67 has retracted so that the volume of the accumulator chamber has increased by approximately 80 percent of its maximum volume of material required to fill a cavity, the cylinder 20 is operated to lower the mould table as shown in FIG. 5. This results in the nozzle 69 coming out of engagement with the uppermost mould element 35 and the valve 70 closes. The extruder works continuously and feeds material into the accumulator chamber whose volume continues to increase as the ram 67 retracts. When the table 14 has been lowered as shown in FIG. 5, the nose 61 operated by the jack 55 is in line with the opening 24 and the jack 55 can be operated to eject the lowermost part of mould elements 35 and 36. Prior to this ejection, the cavity 33 is connected to drain and the springs 32 lift up the piston member 27 thus relieving the downward pressure on the stack of mould elements. The jack 55 is now operated and the nose 61 passes through the openin 24 and engages the lowermost pair of elements 35 and 36 and pushes them to the left.

When the mould elements 35 and 36 are clear of the pneumatic rams 62 these are operated and they slightly lift the stack of mould elements remaining in the guide 23 thus to give clearance to the lowermost pair of elements 35 and 36 whose ejection is continued so that they rest on the ejection platform 63. The moulded body which has been formed in the cavity 47 is indicated at 91 and drops out through the aperture 64 in the ejection platform. The rams 62 are operated automatically in dependence on the operation of the jack 55.

Figure 6:
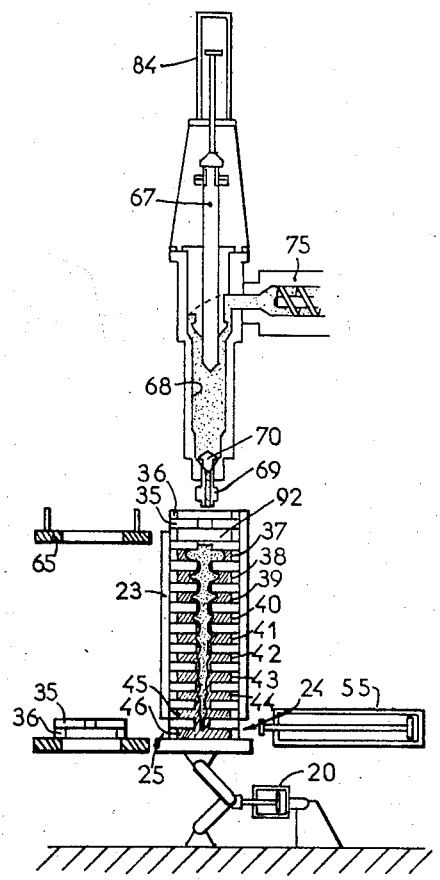

The jack 55 is now retracted to bring the nose 61 back to its original position clear of the guide 23 and the rams 62 are retracted to lower the mould stack on to the mould table 14. This is shown in FIG. 6 and it will be seen that the mould cavity 46 is now at the bottom of the stack, and that the elements defining the cavity with the mould table 14 will be the next to be ejected.

The elements which have been preheated on the insertion platform 65 are now fed into the guide through the opening 34, the heating jacket 66 having been removed. There is thus formed a fresh empty cavity 92 at the input end of the mould series. The jack 55 is now operated to lift the table 14 to its uppermost position, thus bringing the nozzle 69 into engagement with the uppermost element 35 ready for injection of material into the cavity 92. Prior to this injection, pressure oil is supplied to the cavity 33 to move the piston member 27 downwardly to force the mould elements into engagement with one another to prevent flashing. The arrangement is now back to the position shown in FIG. 3.

Preferably the signal for raising the mould table 14 is generated by the ram 67 having reached the upper end of its stroke.

The mould elements 35 and 36 which have been emptied and are on the ejection platform 63 are reversed so that the element 36 is above the element 35 and placed on the insertion platform 65 ready to be preheated with the heating jacket 66 and subsequently to be inserted into the guide 23. The reversal of the mould elements is carried out because when the mould table 14 is dropped as shown in FIG. 5 there may be some tendency for the molten material in the upper cavity, the cavity 37 in that figure, to exude onto the upper surface of the uppermost element 35 and if one then tried to slide a ring 36 over the upper surface of the element 35 this would cause difficulties. By feeding the elements in with the ring on top, any plastic material which has exuded on to the upper surface of the uppermost element 35 will not prevent the insertion of a further pair of mould elements.

It will be seen from the foregoing that except when the ram is moving down and when the table 14 is dropped to enable a fresh pair of mould elements to be inserted and the bottom pair of mould elements to be ejected, the molten plastic material the series of moulds are under pressure so that any shrinkage which takes place is compensated for by further material feeding into the mould. Thus, except when the valve 70 is closed and the mould cavity at the input end of the series is being filled, which is for a comparatively short time in the moulding cycle, the molten plastic material in all the mould cavities is under a pressure as the ram 67 is ascends while the accumulator chamber is still connected to the mould series.

During operation, the moulds are heated and cooled as described in relation to FIG. 1. The uppermost mould cavity is neither heated nor cooled, the next lower plurality of mould cavities are cooled and the last two cavities above the one defined in part by the table 14 are preheated. Obviously this heating is insufficient to melt the plastic material but does tend to get rid of surplus cooling medium in the passages 51 and 52 and also start to rewarm the mould.

Various modifications may be made to the arrangements specifically described. Thus as described, the mould table and the series of moulds moves up and down while the nozzle remains stationary. If desired, the nozzle could be arranged to move up and down while the series of moulds remains stationary.

The precise increase in volume of the accumulator chamber which should be take place before the mould series is disconnected from the nozzle will depend on the rate of feed of material into the accumulator chamber and the time taken to eject a full mould and insert an empty one. Obviously, it is advantageous for the accumulator chamber to be in communication with the mould series over as great a proportion in the cycle time as is conveniently possible.

By the method and apparatus of the invention a high output rate can be obtained with a low capital cost and defects in the moulded bodies due to shrinkage is avoided. The invention has been described in detail in connection with the manufacture of simple cylindrical bodies which are to serve as preforms for further working, e.g., by forging, but the invention can be applied to the manufacture of articles of different shapes so long as the shapes are reasonably simple and are capable of being mouldes in a manner substantially similar to that described.

We claim:

1. Apparatus for use in the moulding of synthetic plastics material, the apparatus comprising a chamber, feed means including a barrel and a member movable therein to plasticise synthetic plastics material supplied to the barrel and to feed said plasticised material into the chamber, mould means defining a series of intercommunicating mould cavities, the series having an input end and an output end, a nozzle interposed between said input end and the chamber to feed plasticised synthetic plastics material into the mould cavities of the series at the input end, means for causing relative movement between the nozzle and the series so as to enable mould means to be moved from the output end of the series to be inserted, after it has been emptied, at the input end of the series to provide an empty mould cavity and then brought into engagement with the nozzle, a valve associated with the nozzle, means to open the valve for passage of said plastic material through the nozzle to the mould means when the nozzle is engaged by said mould means at said input end and to close said valve when the nozzle is disengaged from said mould means at the input end, and means for varying the volume of the chamber while maintaining plasticised synthetic plastics material therein under pressure while the valve is open and the nozzle is in communication with the chamber, whereby plasticised synthetic plastics material passes through the nozzle into the series of mould cavities to fill voids left by shrinkage of the material in such cavities as the material solidifies.

2. Apparatus according to claim 1 including means for cooling at least some of the mould cavities of the series excepting the mould cavity at the input end of the series to accelerate the solidification of the plastics material therein and means for heating a number of mould cavities adjacent the output end of the series.

3. Apparatus according to claim 1 wherein the nozzle is associated with a shut-off valve which is opened when the nozzle is engaged with the mould means and is closed when the nozzle is disengaged from the mould means.

4. Apparatus according to claim 1 wherein the means for feeding the fluid material into the accumulator chamber is a screw feeder arranged to work continuously.

5. Apparatus according to claim 1 wherein the mould cavities are provided by mould means which comprise a plurality of apertured plate-like elements interleaved with a plurality of ring-like elements.

6. Apparatus according to claim 5 wherein said elements are arranged in a tubular guide which has means at one end to allow the elements to be inserted and means at the other end to allow elements to be removed.

7. Apparatus according to claim 6 including means to eject mould elements from said other end of the guide while supporting the remaining elements in the guide.

* * * * *